(12) United States Patent
Shiraishi et al.

(10) Patent No.: US 6,347,003 B1
(45) Date of Patent: *Feb. 12, 2002

(54) MULTI-BEAM LASER EXPOSER UNIT

(75) Inventors: Takashi Shiraishi, Sagamihara; Masao Yamaguchi, Kawaguchi, both of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,906

(22) Filed: Aug. 20, 1999

Related U.S. Application Data

(62) Division of application No. 08/970,560, filed on Nov. 14, 1997, now Pat. No. 5,963,354, which is a division of application No. 08/527,782, filed on Sep. 13, 1995, now Pat. No. 5,734,489.

(30) Foreign Application Priority Data

Nov. 9, 1994 (JP) ............................................ 6-274953

(51) Int. Cl.$^7$ ................................................ G02B 26/08
(52) U.S. Cl. ...................... 359/204; 359/216; 347/243
(58) Field of Search ..................... 359/204, 216–219; 347/232–233, 241–243

(56) References Cited

U.S. PATENT DOCUMENTS

| | | | |
|---|---|---|---|
| 4,571,021 A | 2/1986 | Minoura et al. | 359/204 |
| 5,052,767 A | 10/1991 | Sugata et al. | 359/206 |
| 5,194,952 A | 3/1993 | Morimoto | 359/206 |
| 5,208,456 A | 5/1993 | Appel et al. | 359/204 |
| 5,251,055 A | 10/1993 | Koide | 359/204 |
| 5,463,418 A | 10/1995 | Tateoka | 347/244 |
| 5,471,236 A | 11/1995 | Ito | 347/241 |
| 5,715,078 A * | 2/1998 | Shiraishi | 359/204 |
| 5,963,354 A | 10/1999 | Shiraishi et al. | |

FOREIGN PATENT DOCUMENTS

| | | |
|---|---|---|
| JP | 62-177520 | 8/1987 |
| JP | 63-9361 | 1/1988 |
| JP | 2-129614 | 5/1990 |
| JP | 5-34612 | 2/1993 |
| JP | 5-83485 | 4/1993 |

* cited by examiner

Primary Examiner—Cassandra Spyrou
Assistant Examiner—Jared Treas
(74) Attorney, Agent, or Firm—Foley & Lardner

(57) ABSTRACT

A multi-beam laser exposure unit of the present invention includes a light beam deflector for deflecting a light beam in a predetermined direction, a plurality of laser devices, a pre-optical system, including a glass lens and a plastic lens, for converting a cross sectional shape a of light beam emitted from the respective laser devices to a predetermined shape, and a post-deflection optical system, including two lenses for image-forming each light beam deflected by the deflector to be scanned on a predetermined image surface at a uniform speed. The power of the two lenses of the post-deflection optical system is defined to be positive in a direction parallel to a rotational axis of reflective surfaces of the deflector. Also, at least one lens surface of these lenses is formed not to include a rotational symmetrical surface.

5 Claims, 8 Drawing Sheets

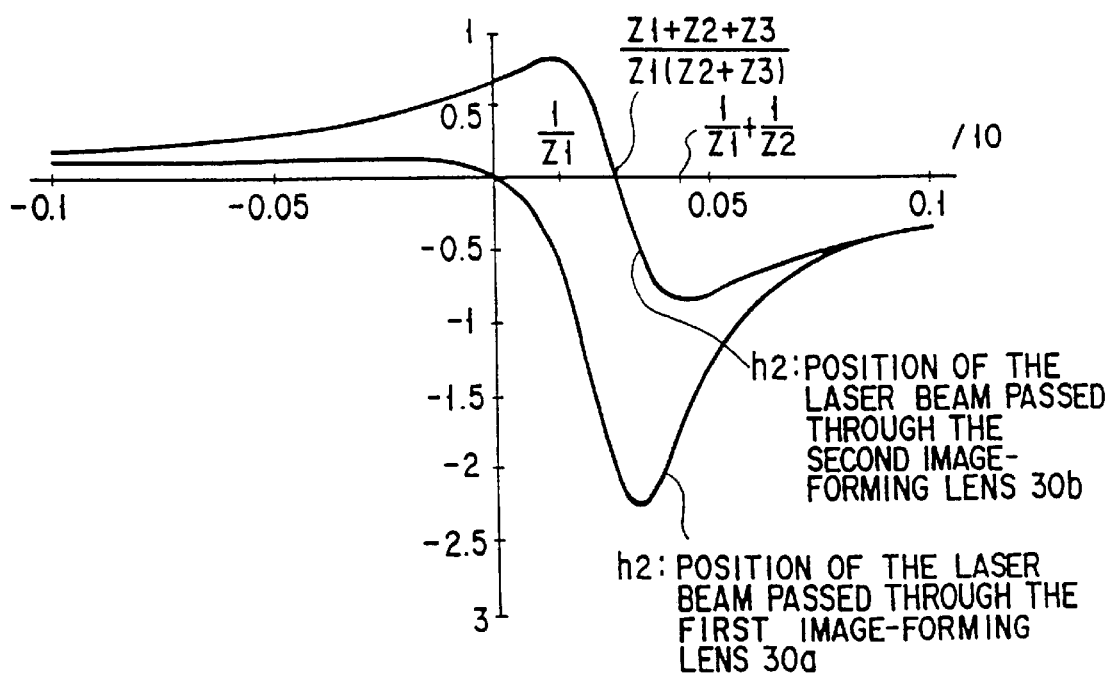
F I G. 10

MULTI-BEAM LASER EXPOSER UNIT

This application is a divisional of application Ser. No. 08/970,560, filed Nov. 14, 1997, U.S. Pat. No. 5,963,354, which is in turn a divisional of 08/527,782, filed Sep. 13, 1995, U.S. Pat. No. 5,734,489.

BACKGROUND OF THE INVENTION

1. Field of the Invention

The present invention relates to a multi-beam exposer unit, which can be used in a color printer having a plurality of drums, a color copy machine having a plurality of drums, a high-speed laser printer or a digital copy machine, for scanning a plurality of beams.

2. Description of the Related Art

In an image forming unit such as a color printer having a plurality of drums or a color copy machine having a plurality of drums, there are used a plurality of image forming sections for forming an image in accordance with color components, which are color-separated, and a laser exposer unit for providing a plurality of image data, i.e., a plurality of laser beams for every color component. As a laser exposer unit, there are known an example in which a plurality of laser exposer units are arranged and an example in which a multi-beam laser exposer unit, which is structured to be able to provide a plurality of laser beams.

In Japanese Patent Application KOKAI Publication No. 5-83485, there is an example using N sets of a light source, a cylinder lens, and glass fθ lens groups, and N/2 of polygon mirrors wherein the number beams is N. For example, in the case of four beams, four sets of the light sources, the cylinder lens glass fθ lens groups, and two polygon mirrors are used.

Moreover, for example, there is proposed an example of using a lens of a part of the fθ lens group in common. In other words, there is proposed a method in which two groups of fθ lens are set, all laser beams are passed through the fθ lens close to the polygon mirror, the number of fθ lenses far away from the polygon mirror is set to four, and each laser beam is individually passed through each lens.

Separately from the above examples, Japanese Patent Application KOKAI Publication No. 62-232344 discloses an example in which at least a part of a lens surface of the fθ lens is formed to have a toric surface to be used in common. Also, in Japanese Patent Application KOKAI Publication No. 62-232344, there is proposed that several fθ lenses are formed of plastic to improve a degree of design freedom of each lens surface and an aberration characteristic at an image-forming position. Japanese Patent Application KOKAI Publication No. 62-232344 also discloses a method in which each lens is used in common and all laser beams are passed through each lens.

Japanese Patent Application KOKAI Publication No. 5-83485 shows an apparatus in which the members corresponding to four sets of laser beam exposure units are incorporated into one housing. As compared with a case of using a plurality of laser beam exposer units, the space which is occupied by the laser exposer unit, is reduced in the case of using the multi-beam laser beam exposer unit seen in Japanese Patent Application KOKAI Publication No. 5-83485. However, from the viewpoint of the single laser exposer unit, the cost of parts and that of the assembly rise due to an increase in the number of lenses or the number of mirrors. Moreover, the size and weight as a single unit are increased. Furthermore, it is known that a curve of the main scanning line of the laser beam of each color component or deviation of the aberration characteristic on the image-forming surface such as a fθ characteristic becomes uneven due to deviation of the manufacture of the same fθ lenses, an error included in individual fθ lenses, or an error of the attachment.

Moreover, in the case of Japanese Patent Application KOKAI Publication No. 62-232344, since only the toric surface whose shape is not optimized is provided, there is a problem in that curve of the main scanning line is generated in any of the plurality of laser beams. There is also proposed an example in which a part of the laser beam directing to a deflector is controlled to be directed to a direction of an optical axis. However, it is difficult to sufficiently compensate for the aberration characteristic in all image-forming areas. Moreover, a refractive index of the lens formed of plastic is relatively largely changed by the change of temperature. Due to this, field curvature, curve of the main scanning line, or the fθ characteristic vary largely under environmental conditions over a wide range, particularly a state that the temperature condition is changed, there occurs a problem in which a field curvature, and a curve of the main scanning line, or the fθ characteristic vary largely. Moreover, in the case of Japanese Patent Application KOKAI Publication No. 62-232344, conditions such as achromatism on the entire area of the sub-scanning direction, curvature, distortion of the image surface, and a lateral magnification are not satisfied. Due to this, the number of lenses is increased. Furthermore, since the accuracy of the housing must be extremely highly set in order to ensure parallelism of the main scanning line of each laser beam, the manufacturing cost rises.

SUMMARY OF THE INVENTION

An object of the present invention is to provide a multi-beam laser exposer unit, which can be applied to the image forming unit for forming a color image in proper registration, with low cost.

Another object of the present invention is to provide a multi-beam laser exposer unit which does not need complicated adjustment.

Moreover, another object of the present invention is to provide a multi-beam exposer unit, which is not subjected to influence of deviation between the beams, that is, an error included in individual fθ lenses.

According to a first aspect of the present invention, there is provided a multi-beam laser exposer unit comprising: a plurality of light beam sources for emitting light beams; deflecting means, having reflective surfaces formed to be rotatable, for deflecting light beams emitted from the light beam sources in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having two lenses, each of the lenses having a function of image-forming each of the light beams deflected by the deflecting means to be scanned on a predetermined image surface at a uniform speed, and a function of correcting influence of variation of an inclination of the reflective surface on a position of the light beam on the image surface, being exerted onto each of the light beams, expressed as deviation of an angle formed between the reflective surface of the deflector and the rotational axis of the reflective surface, each of the lenses having positive power in a direction parallel to the rotational axis of each surface of the deflecting means, and each light beam crossing each other between the lenses in the direction parallel to the rotational axis of each surface of the deflecting means.

According to a second aspect of the present invention, there is provided a multi-beam laser exposer unit comprising: a plurality of light beam sources for emitting light beams; deflecting means, having reflective surfaces formed to be rotatable, for deflecting light beams emitted from the light beam sources in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having two lenses, each of the lenses having a function of image-forming each of the light beams deflected by the deflecting means to be scanned on a predetermined image surface at a uniform speed, and a function of correcting an influence of variation of an inclination of the reflective surface on a position of the light beam on the image surface, being exerted onto each of the light beams, expressed as a deviation of an angle formed between the reflective surface of the deflector and the rotational axis of the reflective surface, and at least one lens surface of four lens surfaces of each of the lenses is formed on a portion other than a rotational symmetrical surface.

According to a third aspect of the present invention, there is provided a multi-beam laser exposer unit comprising: a plurality of light beam sources for emitting light beams; deflecting means, having a rotatable axis and reflective surfaces formed to be rotatable around the rotational axis, for deflecting light beams emitted from the respective light beam sources as substantially one light beam in a predetermined direction; pre-deflection optical means, provided between the deflecting means and each of the light beam sources, for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having two lenses, each of the lenses having a function of image-forming each of the light beams deflected by the deflecting means to be scanned on a predetermined image surface at a uniform speed, and a function of correcting influence of variation of an inclination of the reflective surface on a position of the light beam on the image surface, being exerted onto each of the light beams, expressed as deviation of a angle formed between the reflective surface of the deflector and the rotational axis of the reflective surface, each of the lenses having positive power in a direction parallel to the rotational axis of each surface of the deflecting means, each light beam crossing each other between the lenses in the direction parallel to the rotational axis of each surface of the deflecting means and at least one lens surface of four lens surfaces of each of the lenses is formed on a portion other than a rotational symmetrical surface.

According to a fourth aspect of the present invention, there is provided a multi-beam laser exposer unit, comprising: deflecting means, having reflective surfaces formed to be rotational, for deflecting light beams emitted from a plurality of light beam sources in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; post-deflection optical means having two lenses, each of the lenses having a function of image-forming each of the light beams deflected by the deflecting means to be scanned on a predetermined image surface at a uniform speed, and a function of correcting an influence of variation of an inclination of the reflective surface on a position the light beam on the image surface, being exerted onto each of the light beams, expressed as a deviation of an angle formed between the reflective surface of the deflector and the rotational axis of the reflective surface; and mirror members for separating the respective light beams passed through the post-deflecting optical means, wherein the deflecting means deflect the light beam directing to one of the mirror members provided at a position closest to an image surface and the light beam directing to one of the mirror members provided at a position secondly closest to an image surface at a narrowest distance in a direction parallel to the rotational axis of the surface of the deflecting means.

According to a fifth aspect of the present invention, there is provided a multi-beam laser exposure unit comprising: a plurality of light beam sources for emitting light beams, the respective light beam sources provided in a second direction perpendicular to a first direction to have a different distance, and directed to a different direction from each other in a plane including the first direction; a combined mirror, having reflective surfaces whose number is smaller than the number of the light beam sources by one, for directing each of light beams emitted from the light beam sources in the same direction of the first direction; deflecting means, having reflective surfaces formed to be rotatable in the first direction, for deflecting the respective light beams emitted from the respective light beam sources and combined by the combined mirror in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having two lenses, each of the lenses having a function of image-forming each of the light beams deflected by the deflecting means to be scanned on a predetermined image surface at a uniform speed, and a function of correcting an influence of variation of an inclination of the reflective surface on a position of the light beam on the image surface, being exerted onto each of the light beams, expressed as a deviation of an angle formed between the reflective surface of the deflector and the rotational axis of the reflective surface, wherein each of normal lines of the mirror surfaces of the combined mirror are arranged at a different angle to a line connecting the deflecting means to a non-reflected light beam source, whose light is not reflected by the combined mirror, and a mirror surface of the combined mirror reflects a light beam separated nearest from a light beam emitted from the non-reflected light beam source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 10 is a schematic view explaining a $\phi_{10}$ determined by equation (12) with respect to the position of the laser beam on the image surface.

DETAILED DESCRIPTION OF THE PREFERRED EMBODIMENT

An embodiment of the present invention will be described with reference to the drawings.

Figure 1:
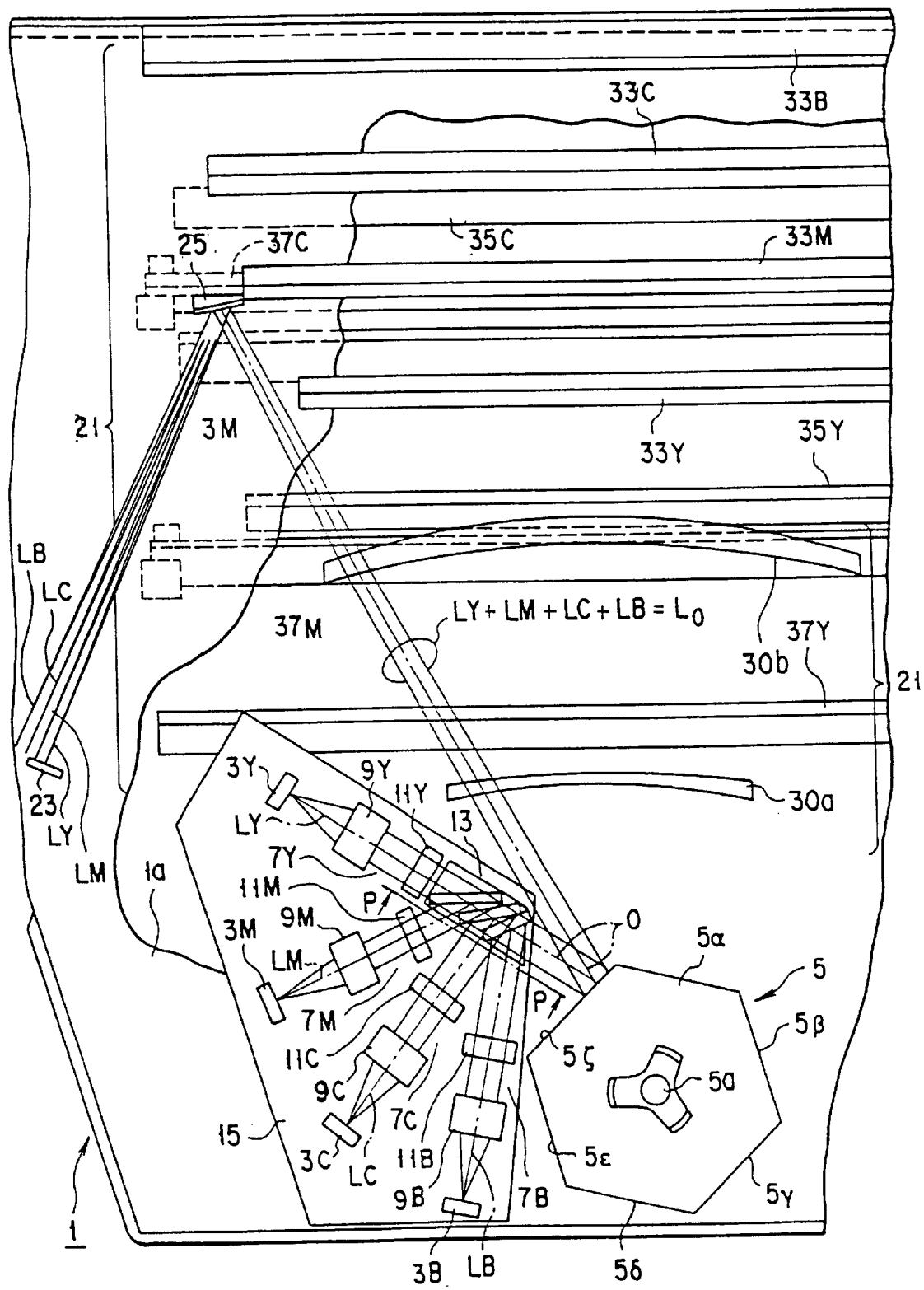
FIG. 1 is a partial plane view schematically showing a laser exposure unit of an embodiment of the present invention.
Figure 2:
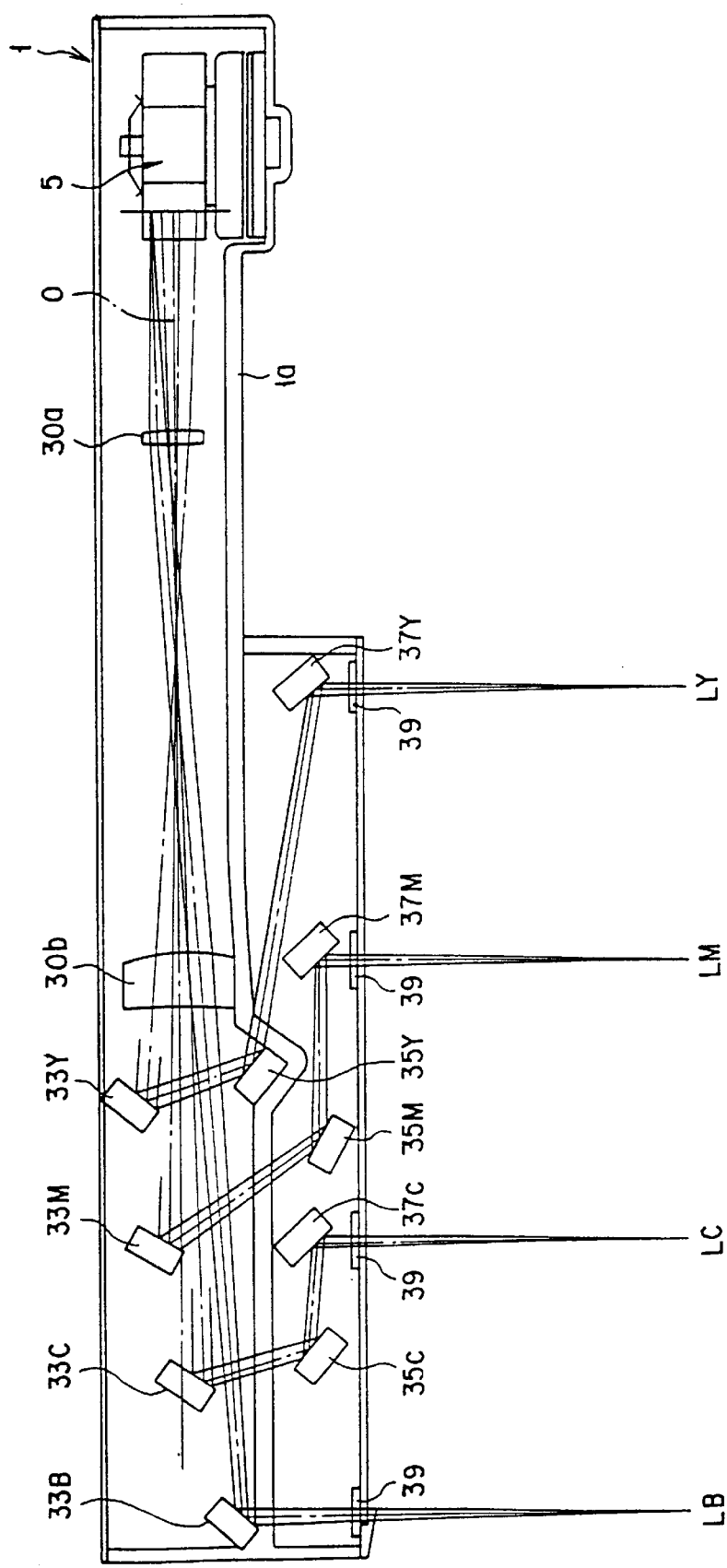
FIG. 2 is a cross sectional view of the laser exposure unit of FIG. 1 shown by cutting along an optical axis directing from a deflector to an image plane.

FIGS. 1 and 2 are a schematic plane view and a schematic cross sectional view of a multi-beam light scanning unit 1 of an embodiment of the present invention, respectively.

In a multi-color laser beam printer, there are used image data which is color-separated to the respective color components of Y (Yellow), M (Magenta), C (Cyan), and B (Black), and four pairs of image forming units for forming an image corresponding to image data, which is color-separated to the respective color components Y, M, C, and B. Therefore, the units and image data can be discriminated by the subscripts of Y, M, C, and B.

According to FIGS. 1 and 2, the multi-beam light scanning unit 1 has first to fourth semiconductor lasers 3Y, 3M, 3C, and 3B for emitting first to fourth laser beams LY, LM, LC, and LB corresponding to image data, which is color-separated to the respective color components Y, M, C, and B, and one polygonal mirror unit 5, which scans first to fourth laser beams LY, LM, LC, and LB emitted from the semiconductor lasers 3Y, 3M, 3C, and 3B in a direction to an image surface (not shown) (an image forming object provided at a predetermined position, for example, a surface of a photosensitive drum) at a predetermined linear speed.

Each of light source side optical systems, that is, pre-deflection optical systems 7Y, 7M, 7C and 7B is provided between each of the lasers 3Y, 3M, 3C, 3B and the deflector 5. The pre-deflection optical systems 7Y, 7M, 7C and 7B are used to adjust the shapes of the cross-section beam spots of the laser beams LY, LM, LC, LB emitted from the semiconductor lasers 3Y, 3M, 3C, 3B to predetermined shapes, respectively.

A post-deflection optical system 21 is provided between the deflector 5 and the image surface (not shown). The post-deflection optical system 21 is used such that the laser beams LY, LM, LC, LB deflected by the deflector 5 are image-formed at a predetermined position, substantially linearly, on the image surface, respectively.

The following will explain the deflector 5, the pre-deflection optical systems 7 and the post-deflection optical system 21.

Each of the pre-deflection optical systems 7 (except 7Y) has a combined mirror 13 between each of the lasers 3 and the deflector 5.

The lasers 3M, 3C, and 3B are arranged to have a predetermined angle in order of 3M, 3C and 3B. The laser 3Y corresponding to a Y (yellow) image is provided such that the laser beam LY, directing to the reflective surface of the deflector 5, can be directly made incident on the deflector 5.

The deflector 5 has a polygonal mirror body 5a having six-face plane reflectors (reflective surfaces) 5α to 5ζ arranged in a shape of a regular polygon, and a motor 5m for rotating the polygonal mirror body 5a in a predetermined direction at a fixed speed. The polygonal mirror body 5a is formed of, for example, an aluminum alloy. Each of the reflective surfaces 5α to 5ζ of the polygonal mirror body 5a is cut along a surface perpendicular to a surface including a direction where the polygonal mirror body 5a is rotated. Then, a surface protection layer, which is formed of $SiO_2$, is deposited on the cut surface.

The pre-deflection optical systems 7Y, 7M, 7C, and 7B have finite focal lenses 9Y, 9M, 9C, and 9B, hybrid cylinder lenses 11Y, 1M, 11C, and 11B, and one combined lens 13. Each of the finite focal lenses 9Y, 9M, 9C, and 9B provides a predetermined convergence to each of the laser beams LY, LM, LC, LB, which is emitted from each of the lasers 3Y, 3M, 3C, 3B, in both a first direction (hereinafter called "main scanning direction") where the laser beams LY, LM, LC, LB are deflected by the deflector 5 and a second direction (hereinafter called "sub-scanning direction"), which is perpendicular to the first direction. Each of the hybrid cylinder lenses 11Y, 11M, 11C, 11B provides further convergence to each of the laser beams L, which are respectively passed through the finite focal lenses 9 (Y, M, C, B), only in the sub-scanning direction. The combined mirror 13 is used to bend three laser beams, which are passed through the respective hybrid cylinder lenses 11M, 11C, 11B, toward reflective surfaces 5α to 5ζ of the polygonal mirror body 5a, respectively. The lasers 3Y, 3M, 3C, 3B, the finite focal lenses 9Y, 9M, 9C, 9B, the hybrid cylinder lenses 11Y, 11M, 11C, 11B, and the combined mirror 13 are integrally arranged on a support member 15, which is formed of, for example, an aluminum alloy.

As the finite focal lenses 9Y, 9M, 9C, 9B, there is used an spherical glass lens or a lens formed by adhering a UV (ultraviolet) light-curing plastic made spherical portion to the surface of the spherical glass lens. The respective finite focal lenses 9Y, 9M, 9C, 9B are fixed onto the support member 15 through a lens holding member, which is not shown and formed of material having substantially the same coefficient of thermal expansion as the support member 15.

Only one horizontal sync detector 23 and only one pair of horizontal sync mirrors 25 is provided in a part of the post-deflection optical system 21 and its surrounding. The horizontal sync detector 23 detects a timing of the respective laser beams LY, LM, LC, LB, which are passed through a predetermined position of the post-deflection optical system 21. The horizontal sync mirrors 25 are provided between the post-deflection optical system 21 and the horizontal sync detector 23 to reflect a part of the four laser beams LY, LM, LC, LB, which are passed through at least one lens (to be described later) of the post-deflection optical system 21 and are reflected from the each reflective surfaces is of the deflector 5 at a predetermined angle.

The post-deflection optical system 21 includes first and second image-forming lenses 30a and 30b. The first and second image-forming lenses 30a and 30b provide a predetermined aberration characteristic to the respective four laser beams LY, LM, LC, LB, which are deflected by the reflective surfaces 5α to 5ζ of the deflector 5 in the entire area of the wide scanning width, that is, the entire length area of the main scanning direction at the image surface of the laser beam scanned on the image surface by the deflector 5. Moreover, the first and second image-forming lenses 30a and 30b are used to control the variation of the image-forming surface of each of the laser beams to be in a fixed range.

There are provided first mirrors 33Y, 33M, 33C, 33B, second mirrors 35Y, 35M, 35C, and third mirrors 37Y, 37M, 37C between the second image-forming lens 30b and the image surface (not shown). The first mirrors 33Y, 33M, 33M, 33B are used to bend the respective four laser beams LY, LM, LC, LB, which are passed through the second image-forming lens 30b, to the image surface. The second mirrors 35Y, 35M, 35C, and third mirrors 37Y, 37M, 37C are used to further bend the laser beams LY, LM, LC, which are bent by the first mirrors 33Y, 33M, 33C. The first and second image-forming lenses 30a and 30b, the first mirrors 33Y, 33M, 33M, 33B, and the second mirrors 35Y, 35M, 35C are respectively fixed to an intermediate base 1a of the laser exposure unit 1 (for example, a plurality of fixing members (not shown) which are integrally formed) with adhesive.

The third mirrors 37Y, 37M, 37C are arranged at the intermediate base 1a to be movable to at least one direction in connection with the sub-scanning direction through a fixing rib (not shown), which is integrally formed, and an inclination adjusting mechanism (not shown).

As is clear from FIG. 2, the laser beam LB corresponding to the B (black) image is bent by the first mirror 33B, and guided to the image surface without being passed through the other mirrors. Dustproof glasses 39Y, 39M, 39C, 39B are arranged at a portion among the third mirrors 37Y, 37M, 37C, the first mirror 33B, and the image surface, and a position where four laser beams LY, LM, LC, LB reflected by the mirrors 33B, 37Y, 37M, 37C are emitted from the laser exposer unit 1. The dustproof glasses 39Y, 39M, 39C, 39B are used to prevent toner and/or dust from being entering the interior of the laser exposure unit 1.

The following will specifically explain the pre-deflection optical system.

Figure 3:
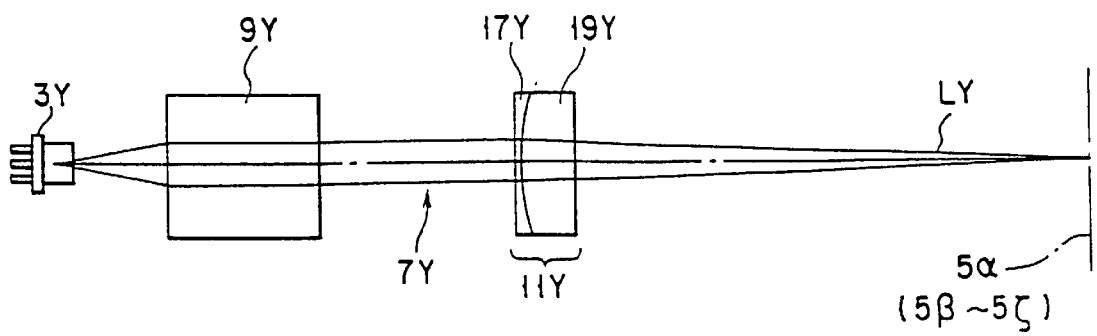
FIG. 3 shows a pre-deflection optical portion of the laser exposure unit of FIG. 1, and particularly an expanded view of an optical path of a yellow laser beam directing to a polygonal mirror from a laser 3Y.

FIG. 3 is a partially cross sectional view of the pre-deflection optical system 7 from which a mirror block is omitted. Table 1 shows optical characteristic data of the lenses forming the pre-deflection optical system 7 and the members optical function. In FIG. 3, the lenses corresponding to one laser beam LY (corresponding to the yellow image) and the optically functioning members are typically shown.

The hybrid cylinder lens 11Y is formed of a cylinder lens 17Y of PMMA having substantially the same radius of curvature to the sub-scanning direction, and a glass cylinder lens 19Y. The surface of the cylinder lens 17Y, which is in contact with air, is formed to be plane.

An outgoing surface of the cylinder lens 17Y and an incident surface of the cylinder lens 19Y are adhered to each other, or pressurized toward a positioning member (not shown) from a predetermined direction, so that the cylinder lens 17Y and the glass cylinder lens 19Y are formed to be integral with each other. The cylinder lens 17Y may be integrally formed on a surface having curvature of the cylinder lens 19Y.

The cylinder lens 17Y is formed of material such as PMMA (polymethyl methacryl). The cylinder lens 19Y is formed of material such as SFS1. The cylinder lenses 17Y and 19Y are fixed to the finite focal lens 9 through the positioning member, which is formed to be integral with the support member 15, to have a correct distance.

Table 1 shows optical numeric data of the pre-deflection optical system 7.

TABLE 1

| A (pre-deflection optical lens data for YELLOW, BLACK) | | | | |
|---|---|---|---|---|
| curvature | | | | |
| main-scanning | sub-scanning | thickness | material | others |
| — | — | 10.980 | air | f = 10.658 |
| plane | plane | 24.858 | air | NA = 0.33 |
| plane | 2.759 × $10^{-2}$ | 0.1 | PMMA | |
| plane | plane | 5.0 | glass | n = 1.895 |
| | | 67.270 | air | | shift from optical axis at reflecting surface 5α–5ζ of optical deflector: 2.981 inclination from optical axis at reflecting surface 5α–5ζ of optical deflector: 1.672 × $10^{-2}$ (rad)

For black, shift and inclination amount is given by multiplying −1

| B (pre-deflection optical lens data for MAGENTA) | | | | |
|---|---|---|---|---|
| curvature | | | | |
| main-scanning | sub-scanning | thickness | material | others |
| — | — | 10.980 | air | f = 10.658 |
| plane | plane | 31.795 | air | NA = 0.33 |
| plane | 2.759 × $10^{-2}$ | 0.1 | PMMA | |

TABLE 1-continued

| plane | plane | 5.0 | glass | n = 1.895 |
|---|---|---|---|---|
|  |  | 67.840 | air |  |

| shift from optical axis at reflecting surface 5α–5ζ of optical deflector | 0.729 |
|---|---|
| inclination from optical axis at reflecting surface 5α–5ζ of optical deflector | 4.037 × 10⁻³ (rad) |

C (pre-deflection optical lens data for CYAN)

| curvature | | | | |
|---|---|---|---|---|
| main-scanning | sub-scanning | thickness | material | others |
| — | — | 10.980 | air | f = 10.658 |
| plane | plane | 31.016 | air | NA = 0.33 |
| plane | 2.759 × 10⁻² | 0.1 | PMMA |  |
| plane | plane | 5.0 | glass | n = 1.895 |
|  |  | 67.773 | air |  |

| shift from optical axis at reflecting surface 5α–5ζ of optical deflector | 1.230 |
|---|---|
| inclination from optical axis at reflecting surface 5α–5ζ of optical deflector | 6.864 × 10⁻³ (rad) |

As is clear from Table 1, as four sets of the finite focal lenses 9, substantially the same lenses are used. Also, as four sets of the hybrid cylinder lenses 11, substantially the same lenses are used. The pre-deflection optical system 7Y corresponding to Y (yellow) and the pre-deflection optical system 7B corresponding to B (block) are arranged in substantially the same manner. The pre-deflection optical system 7M corresponding to M (Magenta) and the pre-deflection optical system 7C corresponding to C (Cyan) are arranged such that the distance between the finite focal lens 9 and the hybrid cylinder lens 11 is widened as compared with the pre-deflection optical systems 7Y and 7B.

Figure 4:
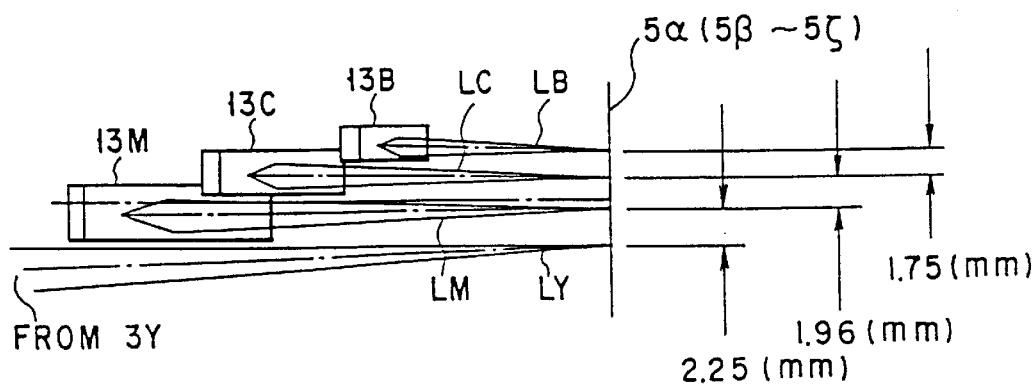
FIG. 4 is a front view of each of the pre-deflection optical systems cut along arrows P—P of FIG. 1 to show a state of each laser beam close to a combined mirror of the pre-deflection optical system of the laser exposure unit of FIG. 1.

FIG. 4 shows the laser beams LY, LM, LC, and LB which are respectively emitted from the laser devices 3Y, 3M, 3C, and 3B and directed to the deflector 5 in a state that each of the pre-deflection optical systems 7Y, 7M, 7C, 7B shown in FIG. 3 and Table 1 is cut along arrows P-P of FIG. 1 in a direction parallel to the rotational axis of the reflective surface of the deflector 5.

As is clear from FIG. 4, the laser beams LY, LM, LC, and LB are guided to the deflector 5 to have a different distance in a direction, which is parallel with the rotational axis of the reflective surface of the deflector 5. Moreover, the laser beams LM and LC are asymmetrically guided to each of the reflective surfaces of the deflector 5 to sandwich the surface, which is perpendicular to the axis of the reflective surface of the deflector 5 and which includes the center of the reflective surface in the sub-scanning direction, that is, the surface including the optical axis of the system of the laser exposure unit 1. Regarding the distance among the laser beams LY, LM, LC, and LB on each reflective surface of the deflector 5, the distance between LY and LM is 2.25 mm, the distance between LM and LC is 1.96 mm, and the distance between LC and LB is 1.75 mm.

The following will specifically explain the optical characteristic of the hybrid cylinder lens 11Y.

The first and second image-forming lenses 30a and 30b (post-deflection optical system 21) are formed of plastic such as PMMA. Due to this, it is known that a refractive index n is varied from 1.4876 to 1.4789 if a peripheral temperature is changed between 0° C. and 50° C.

In this case, the sub-scanning direction image forming position is varied about ±12 mm when the laser beams, which are passed through the first and second image-forming lenses 30a and 30b, are actually condensed on the image surface (not shown), by using a previously normally glass lens to change the hybrid cylinder lens 11 of the present invention. In order to reduce the above variation, the lenses, which are formed of the same material as used in the lenses used in the post-deflection optical system 21, are incorporated into the pre-deflection optical system 7 in a state that its curvature is optimized. Thereby, the variation of the sub-scanning direction image forming position, which is caused by the variation of the refractive index n due to the change of temperature when the laser beams are actually condensed on the image surface, can be reduced to about ±0.5 mm. Therefore, as compared with the conventional optical system in which the pre-deflection optical system 7 is formed of glass lenses and the post-deflection optical system 21 is formed of plastic lens, it is possible to correct the chromatic aberration of the sub-scanning direction, which is caused by the variation of the reflective index due to the change of temperature of the lenses of the post-deflection optical system 21.

Figure 5A:
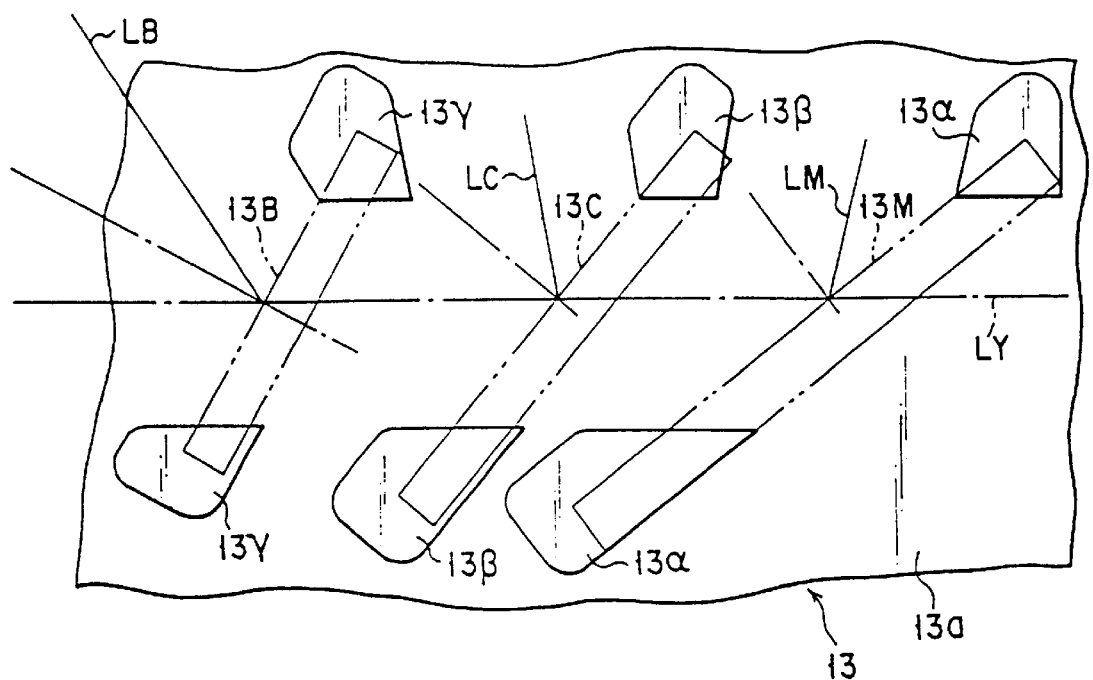
FIGS. 5A and 5B are a plane view and a front view each schematically showing a characteristic of the combined mirror incorporated into the laser exposure unit of FIG. 1
Figure 5B:
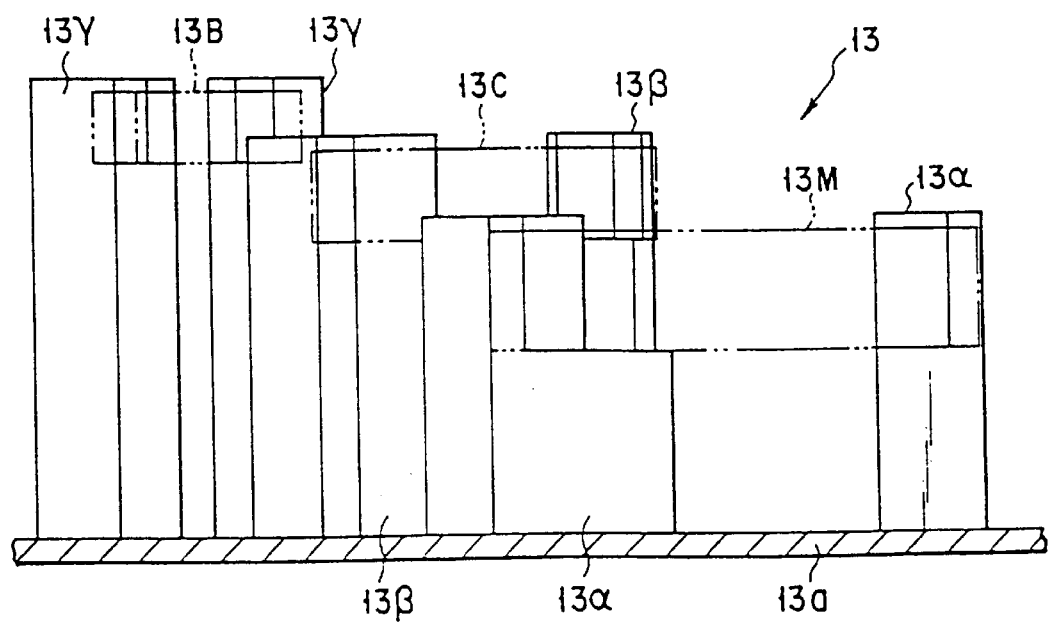

FIGS. 5A and 5B show the combined mirror 13 for guiding the first to fourth laser beams LY, LM, LC, and LB, serving as one flux of laser beams, to each of the reflective surfaces 5α to 5ζ of the reflector 5.

The combined mirror 13 includes first to third mirrors 13M, 13C, 133, first to third mirror holding sections 13α, 13β, 13γ, and a base 13a. The number of the first to third mirrors 13M, 13C, 13B is smaller than the number of image-formable color components (the number of color-separated colors). The first to third mirror holding sections 13α, 13β, 13γ are used to hold the first to third mirrors 13M, 13C, 13B, respectively. The base 13a supports the mirror holding sections 13α, 13β, 13γ. The base 13a, and each of the mirror holding sections 13α, 13β, 13γ are integrally formed of an aluminum alloy having a low coefficient of thermal expansion.

As already explained, the laser beam LY sent from the laser device 3Y is directly guided to each of the reflective surfaces 5α to 5ζ of the deflector 5. In this case, the laser beam LY is passed between the mirror 13M, which is fixed to the first holding section 13α and the base 13a.

Figure 6:
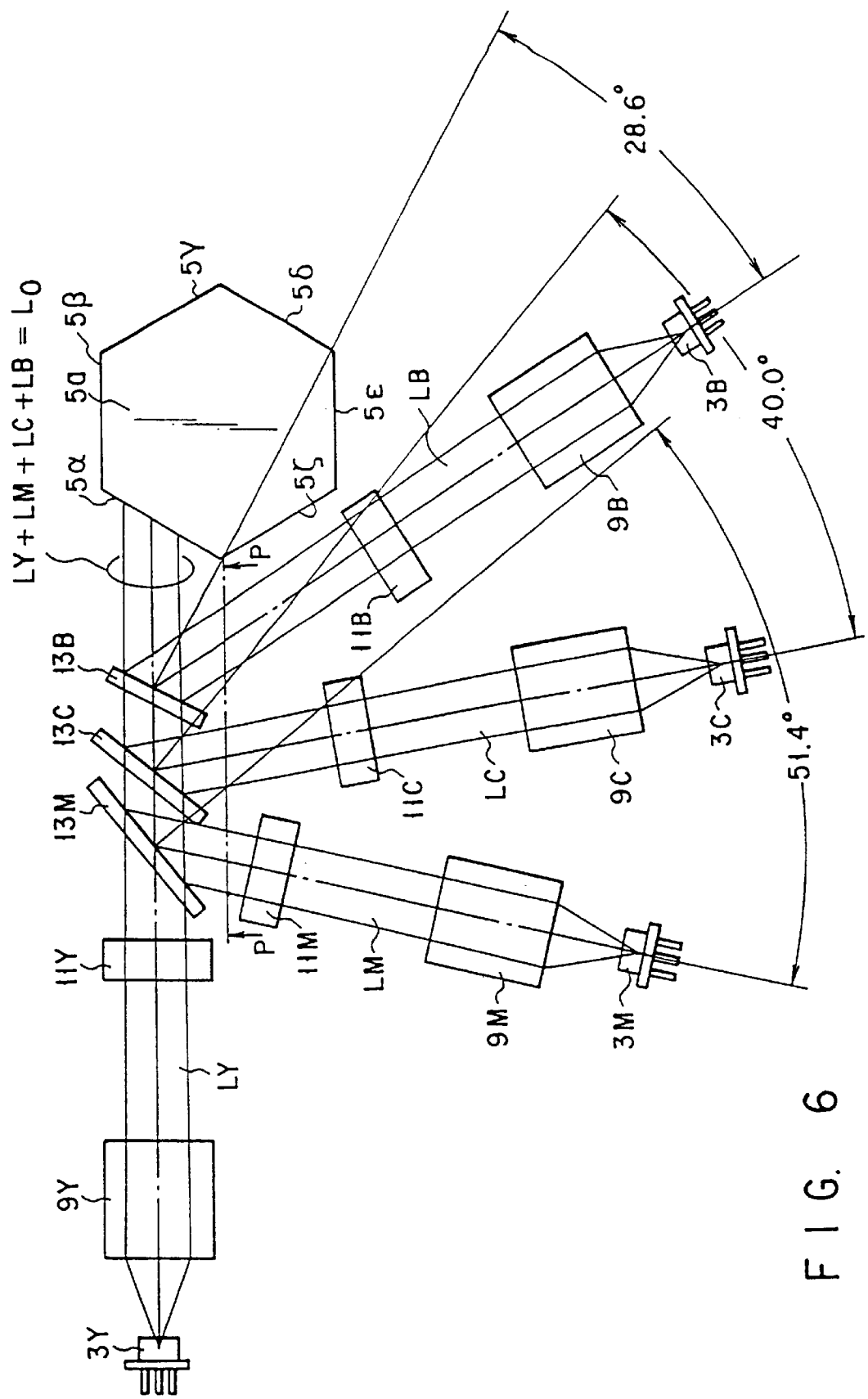
FIG. 6 is a partially enlarged plane view showing the details of the pre-deflection optical portion of the laser exposure unit of FIG. 1.

Incident angles of the laser beams LM, LC, and LB, which are respectively made incident onto the first to third mirrors 13M, 13C, and 13B, are defined to 51.40°, 40.0°, and 28.6°, respectively, as shown in FIG. 6. It is needless to say, these angles are equaled to angles between the laser beam LY and the normal line of the first to third mirrors 13M, 13C, 13B, respectively. In this embodiment, the arrangement of the laser devices 3M, 3C, 3B and the incident angles of the laser beams LM, LC, and LB, which are respectively made incident onto the first to third mirrors 13M, 13C, and 13B, are defined such that the distance between the laser beams close to each other on the reflective surfaces of the deflector 5 becomes large as the incident angle of the laser beam of the laser beams onto each mirror is large.

The following will explain intensity (amount of light) of the respective laser beams LM, LC, LB, which are reflected by the mirrors 13M, 13C, 13B, and guided to the deflector 5, and that of the laser beam LY, which is directly guided to the deflector 5.

As a method for making two or more laser beams incident onto the refractive surfaces of the deflector as one flux of laser beams, Japanese Patent Application KOKAI Publication No. 5-34612, for example, shows a method for overlaying laser beams on each other in order by use of half mirrors. However, in using the plurality of half mirrors, it is well-known that 50% of the amount of each of the light beam emitted from each laser device becomes useless when one reflection and transmission are performed, that is, every time when the laser beam is passed through the half mirror.

In this case, even if transmissivity of the half mirror and reflectance thereof are optimized in accordance with each laser beam, intensity (amount of light) of any one of the laser beams, which are passed through the half mirror, is reduced to about 25% of intensity of the laser beams outputted from the finite focal lens. Moreover, the half mirror is provided to be inclined to the optical path, and the number of half mirrors, which are passed through each laser beam, differs. Due to this, it is well known that there are generated a difference in the optical characteristics such as field curvature and astigmatism of the respective laser beams. Due to the difference in the optical characteristics such as field curvature and astigmatism of the respective laser beams, it is difficult for all laser beams to be image-formed by the same finite focal lens and the same cylinder lens.

In contrast, according to the combined mirror 13 shown in FIGS. 5A and 5B, the respective laser beams LM, LC, and LB are bent by the normal mirrors (13M, 13C, 13B) in the respective laser beams LM, LC and LB, which are made incident onto the respective reflective surfaces of the deflector 5, are separated in the sub-scanning direction. Therefore, the amount of light the respective tive laser beams LM, LC and LB, which are reflected by the normal mirrors 13M, 13C, 13B and supplied to the mirror body 5a, can be maintained to be 90% or more of the the amount of light emitted from the finite focal lens 9. Whereby, the output of the laser beam can be reduced, and the aberration of light to reach the image surface can be uniformly corrected, thereby making it possible to reduce the beam spot and lead to high precision. The laser 3Y corresponding to Y (yellow) is directly guided to each reflective mirror of the deflector 5 without being influenced by the combined mirror 13. Due to this, the output capacity of the laser can be reduced, and influence of the error of the incident angle onto each reflective surface, which may be caused in the other laser beams reflected by the mirrors 13M, 13C, 14B, can be reduced.

Figure 7:
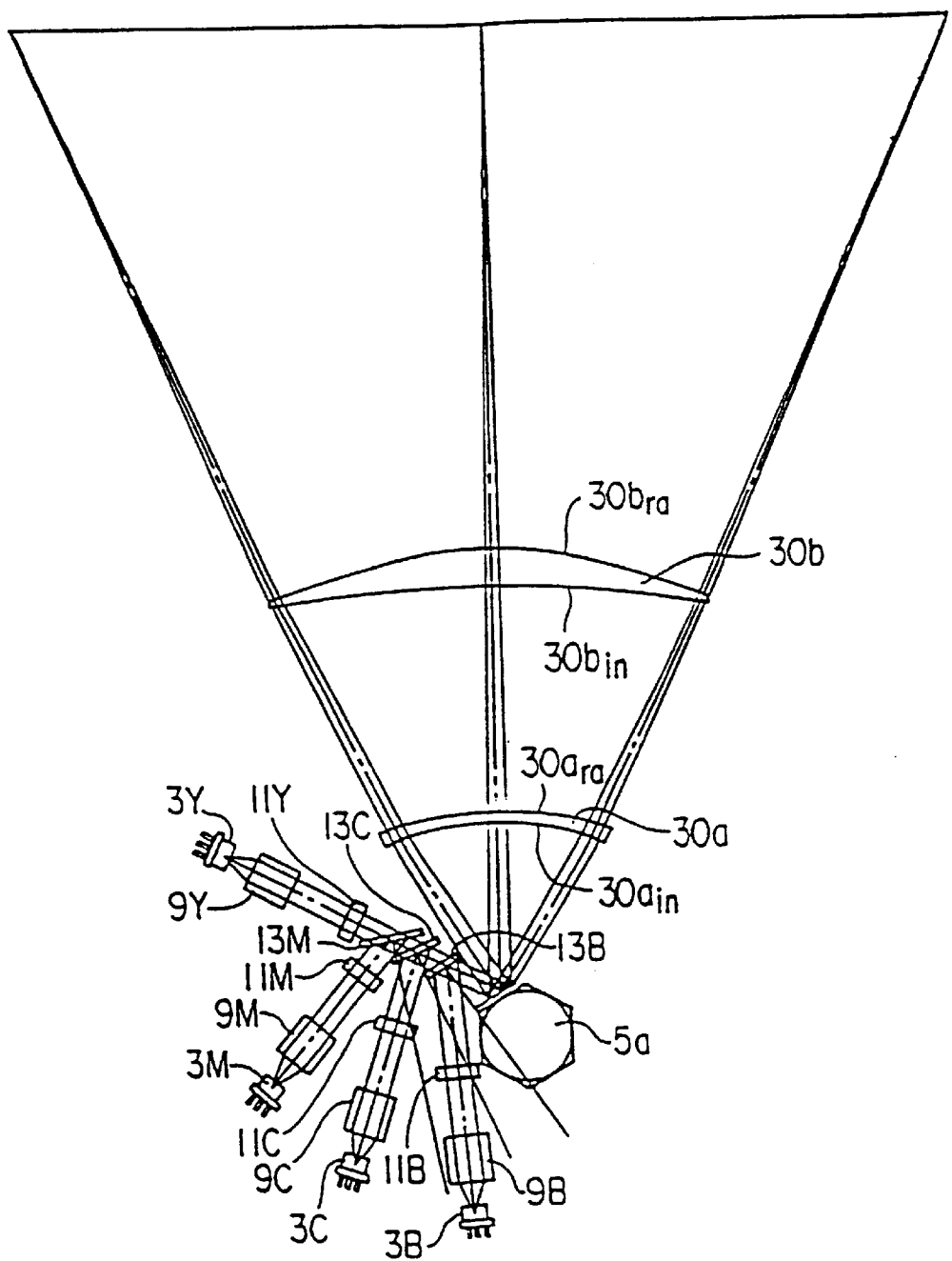
FIG. 7 is a schematic plane view showing the arrangement of the respective optical members of the laser exposure unit of FIG. 1 in a state that an optical path is expanded.
Figure 8:
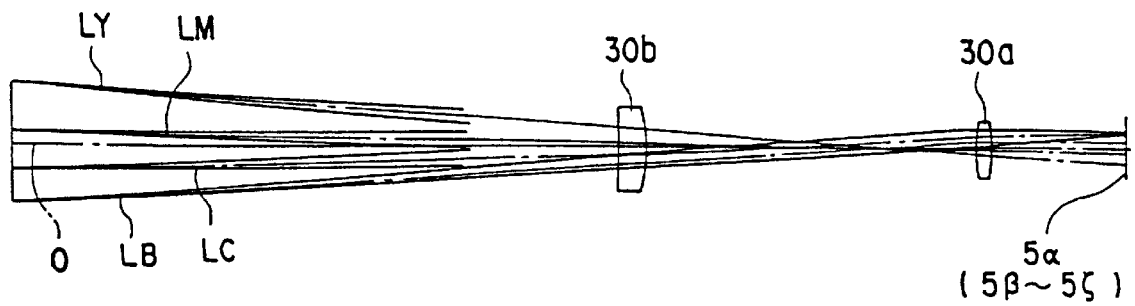
FIG. 8 is a cross sectional view showing the arrangement of the respective optical members of the laser exposure unit of FIG. 7 in a state that an optical path is expanded, and cut along a surface including an optical axis of the post-deflection optical means.
Figure 9:
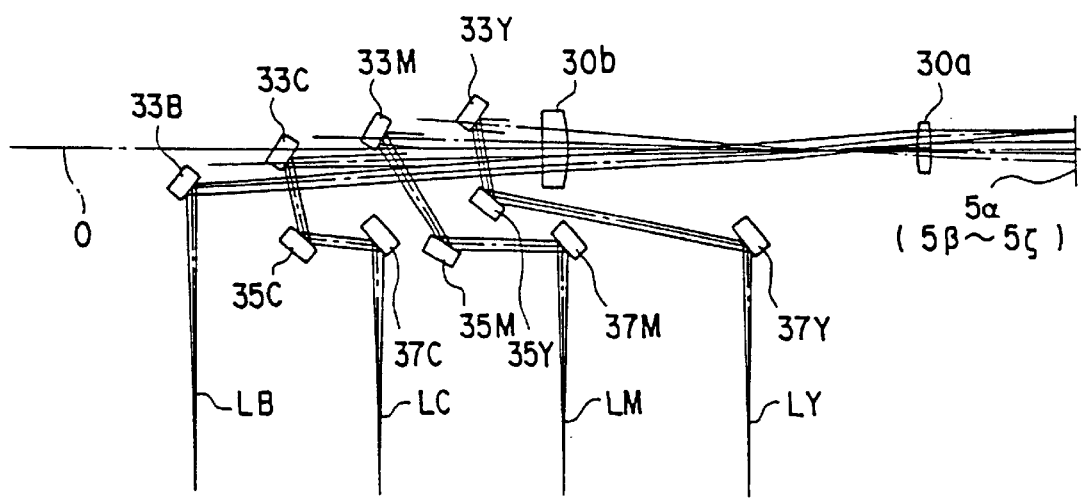
FIG. 9 is a cross sectional view showing the arrangement of the respective optical members of the laser exposure unit of FIG. 1, and cut along a surface including an optical axis of post-deflection optical means.

The following will explain the relationship between the laser beams, which are reflected by the mirror body 5a, and the post-reflection optical system with reference to FIGS. 7 to 9 and Table 2 showing optical data including lens data of each lens of the post-reflection system 21. More particularly, a form of the lens surfaces of the first and second image-forming lenses 30a and 30b are determined by the equation (1), mentioned after.

(post-deflection optical lens data)

| curvature | | | number of lens | |
|---|---|---|---|---|
| CUX | CUY | thickness | surface | material |
| −1.795 × 10⁻² | 3.244 × 10⁻² | 39.527 | | AIR |
| | | 3.00 | 1 | PMMA |
| −1.855 × 10⁻² | −1.305 × 10⁻² | 92.517 | 2 | AIR |
| −2.380 × 10⁻³ | 3.395 × 10⁻² | 9.954 | 3 | PMMA |
| −5.179 × 10⁻³ | 2.043 × 10⁻² | 3.00 | 4 | AIR |
| plane | plane | 2.00 | | BK7 |

-continued (post-deflection optical lens data)

| curvature | | | number of lens | |
|---|---|---|---|---|
| CUX | CUY | thickness | surface | material |
| plane | plane | 170.00 | | AIR |
| plane | plane | | | |

In this case, if a coordinate system is a right-hand system, a shape Z of the lens surface is shown as follow:

$$Z = \frac{CUXX^2 + CUYY^2}{1 + \sqrt{1 - (1 + KX)CUX^2X^2 - (1 + KY)CUY^2Y^2}}$$

wherein X: main-scanning direction, Y sub-scanning direction and note: KX=KY=0.

FIG. 7 is an expanded view of the optical path seen from the direction crossing the sub-scanning direction in a state that the first to third mirrors 33B, 33Y, 33M, 33C, 35Y, 35M, 35C, 37Y, 37M, and 37C and the intermediate base 1a are removed.

FIG. 8 is an expanded view of the optical path is along the optical axis of the sub-scanning direction in a state that a swing angle of the mirror body 5a of the deflector is 0°. In FIG. 8, the laser beams LC, LM and LY in the middle of the course are imaginarily replaced with straight lines and cut in a direction parallel to the axis of the mirror body 5a in a state that the first to third mirrors 33B, 35Y, 35M, 35C, 37Y, 37M, and 37C and the intermediate base 1a are removed in the laser beam.

FIG. 9 is a cross sectional view showing the arrangement of the respective optical members of the laser exposure unit of FIG. 1, and cut along a surface including the optical axis of the post-deflection optical means.

With reference to FIG. 9, the laser beams LY, LM, LC, LB are separated from the laser beam Lo by the corresponding mirrors 33B, 33Y, 33M and 33C in the sub-scanning direction to have a predetermined angle to the optical axis O of the system, respectively.

For example, with reference to the laser beam LC, the laser device 3C is provided at the upper portion of the optical axis 3C at a predetermined angle to the optical axis O of the system in the sub-scanning direction. The laseer beam LC sent from the laser device 3C is reflected on the upper portion of the optical axis O of the system on each reflective surface of the deflector 5. Then, the laser beam LC is passed through the upper portion of the optical axis O of the system or the portion close to the optical axis O at an incident surface $30a_{in}$ of the first plastic lens 30a. Moreover, the laser beam LC is passed through the lower portion of the optical axis O of the system or the portion, which is the closest to the optical axis O at an outgoing surface $30b_{ra}$ of the second plastic lens 30b.

Similarly, with reference to the laser beam LM, the laser device 3M is provided at the slightly lower portion of the optical axis O at a predetermined angle to the optical axis O the system in the sub-scanning direction. The laser beam LM sent from the laser device 3M is reflected on the slightly lower portion of the optical axis O of the system on each reflective surface of the deflector 5. Then, the laser beam LM is passed through the lower portion of the optical axis O of the system or the portion close to the optical axis O at the incident surface $30a_{in}$ of the first plastic lens 30a. Moreover, the laser beam LM is passed through the upper portion of the optical axis O of the system or a portion, which is the closest to the optical axis O at the outgoing surface $30b_{ra}$ of the second plastic lens $30b$.

As is clear from FIGS. 8 and 9, positive power is provided to each of the first and second image-forming lenses $30a$ and $30b$ in the sub-scanning direction. Thereby, at least two laser beams are guided to the is image surface from the directions, which are opposite to each other, to sandwich the optical axis O of the system. By such an arrangement, it is possible to restrain the influence of the variation of the refractive index and thermal expansion caused by the change of the temperature of PMMA, which is used as material of the lenses $30a$ and $30b$, onto the shift of the position in the sub-scanning direction on the image surface. Also, it is possible to reduce the thickness of each of the reflective surfaces $5\alpha$ to $5\zeta$ of the deflector 5 in the sub-scanning direction, that is, the size of the combined cross section of the laser beam L0 in which four laser beams are combined in the sub-scanning direction.

Moreover, the respective laser beams are cross each other in the direction parallel to the rotational axis of each of the reflective surfaces in a state that positive power is provided to each of the first and second image-forming lenses $30a$ and $30b$ in the sub-scanning direction for a period of time when the respective laser beams from the respective lasers 3Y, 3M, 3C and 3B are passed through the respective lenses. Thereby, the shift of the position in the sub-scanning direction, which is caused by the variation of the refractive index, and thermal expansion which is caused by the change of the temperature of PMMA can be reduced.

The following will explain the reason of the reduction of the shift of the position due to the variation of the refractive index based on the theory of the thin lens system.

It has been known that all aberration of the lens system becomes smaller as power of the lens becomes smaller.

In the post-deflection optical system, it is necessary to provide a function of correcting influence of inclination of the reflective surface, which is exerted onto each of the beams, on a position of the light beam on the image surface. The inclination of the reflective surface is expressed as deviation of the angle formed between the reflective surface of the deflector and the rotational axis of the reflective surface. Due to this, the conjugate relationship must be established between the reflective surface of the polygonal mirror and the image surface. In other words, the beam, which is reflected on a certain position of the reflected surface in the sub-scanning direction, is transmitted to a certain position of the image surface in the sub-scanning direction. Therefore, each of the lenses $30a$ and $30b$ preferably has positive power in the sub-scanning direction. If the theory of the thin lens system is applied to the each of the lenses $30a$ and $30b$, total power $\phi$ of the lenses can be obtained based on the following equation:

$$\phi = (\phi_1 + \phi_2 \div z_2) \cdot \phi_1 \cdot \phi_2$$

In this case, to reduce a resultant value obtainable from $\phi_{10}^2 + \phi_{20}^2$, polarity of each of $\phi$, $\phi_1$ and $\phi_2$ is preferably set to be the same. Moreover, since the total power $\phi$ is positive as mentioned above, it is needed that each of power $\phi_1$ and $\phi_2$ is defined to be positive.

Therefore, increase/decrease of power $\phi_1$ and $\phi_2$, which is caused by the change of temperature and that of humidity, is set to be the same direction in each of the lenses. An amount of change of the optical path, which is provided to the beam passed through each of the lenses can be expressed by $h_1 \cdot \phi_1$ and $h_2 \cdot \phi_2$ wherein each of $h_1$ and $h_2$ is a distance when the beam, passing through the first and second lenses $30a$ and $30b$, is away from the center of the sub-scanning direction of the corresponding lens. Therefore, in a case where the polarities of both $h_1$ and $h_2$ are the same, increase/decrease of power $\phi_1$ and $\phi_2$, which is caused by the change of temperature and that of humidity, is set to be the same direction in each of the lenses (the amount of change is amplified). In other words, it is needless to say that the thickness of each of the lenses $30a$ and $30b$ in the sub-scanning direction can be increased.

In contrast, according to the present invention, four laser beams are divided by two. Then, in order that the polarities of the respective $h_1$ and $h_2$ are different from each other, the respective laser beams cross each other in the direction parallel to the rotational axis of each of the reflective surfaces for a period of time when the respective laser beams from the respective lasers 3 are passed through the respective lenses. Thereby, the value of $h_1 \cdot \phi_1$ is increased. However, the value of $h_2 \cdot \phi_2$ is decreased in a case where $h_1$ is positive, for example. According to this method, the thickness of each of the lenses $30a$ and $30b$ in the sub-scanning direction is not increased. The following will explain the reason why the respective laser beams cross each other in the direction parallel to the rotational axis of each of the reflective surfaces for a period of time when the respective laser beams from the respective lasers 3Y, 3M, 3C and 3B are passed through the respective lenses in order that the polarities of the respective $h_1$ and $h_2$ are different from each other.

It is assumed that a distance from the reflecting point on the reflective surface of the deflector 5 to a primary principal plane of the first lens $30a$ is $z_1$, a distance from a secondary principal plane of the first lens $30a$ to a primary principal plane of the second lens $30b$ is $z_2$, a distance from a secondary principal plane of the second lens $30b$ to the image surface is $z_3$, power of the sub-scanning direction in the vicinity of the center of the sub-scanning direction of the first lens $30a$ is $\phi_1$, and power of the sub-scanning direction in the vicinity of the center of the sub-scanning direction of the first lens $30b$ is $\phi_2$.

Power of the thin lens can be expressed by the following equation (3):

$$\mu - (n-1)(c_1 - c_2) \tag{3}$$

wherein n: a refractive index, $c_1$: a curvature of an incident surface, $c_2$: a curvature of an outgoing surface.

Since each of n, $c_1$, and $c_2$ is a function of temperature and a function of humidity, the following equation (4) can be expressed:

$$n - 1 = (1 + \alpha' t + \gamma' w)(n_0 - 1)$$

$$c_1 = (1 + \alpha'' t + \gamma'' w) c_{10}$$

$$c_2 = (1 + \alpha'' t + \gamma'' w) c_{20} \tag{4}$$

wherein t: an amount of variation from a reference temperature, w: an amount of variation from a reference water absorption, $n_0$: a refractive index in a reference state, $c_{10}$: a curvature of an incident surface in a reference state, and $c_{20}$: a curvature of an outgoing surface in a reference state.

If each of equation (4) is substituted with equation (3) and higher-order terms (secondary or more terms) are ignored, the following equation (5) can be obtained:

$$\phi = (1 + a't + \gamma'w + a''t + \gamma w) \quad (5)$$
$$= (n_0 - 1)(c_1 - c_2)$$
$$= (1 + at + \gamma w)\phi_0$$

wherein α: α'+α" and γ: γ'+γ".

If the total power φ of the lenses is reviewed from a viewpoint of temperature, a paraxial ray can be expressed by a gaussian matrix as shown in the following expression (6)

$$\begin{pmatrix} X_2 \\ X_2' \end{pmatrix} = \begin{pmatrix} A & B \\ C & D \end{pmatrix} \begin{pmatrix} X_1 \\ X_1' \end{pmatrix} \quad (6)$$

wherein $X_1$, $X_1'$: height and inclination of the laser beam on the reflective surface of the deflector 5, respectively, and $X_2$, $X_2'$: height and inclination of the laser beam on the image surface.

Since correcting influence of the inclination of the reflective surface onto each of the beam means that the height of the beam guided to the image surface is set to be constant regardless of the inclination of the incident light. Therefore, the following equation (7) can be satisfied:

$$B|_{t=0} = 0 \quad (7)$$

If $\phi_{20}$ is solved by the equation (7), the following equation (8) can be obtained:

$$\phi_{20} = \frac{Z_1 + Z_2 - \phi_{10}Z_1Z_2 + Z_3 - \phi_{10}Z_1Z_3}{Z_1Z_3 + Z_2Z_3 - \phi_{10}Z_1Z_2Z_3} \quad (8)$$

At this time, the position of the which reached the image surface can be expressed by the following equation:

$$X_2 = AX_1 + BX_1' \quad (9)$$

Therefore, in consideration of the change of temperature, the following equation (10) may be satisfied:

$$\left.\frac{\partial X_2}{\partial t}\right|_{t=0} = \left.\frac{\partial X_2}{\partial w}\right|_{w=0} = 0 \quad (10)$$

The condition of the incident beam on the reflective surface of the deflector 5 can be obtained from the equations (8) and (10) as follows:

$$-\frac{X_1}{X_1'} = \frac{(z_1^2 + 2Z_1Z_2 - 2\phi_{10}Z_1^2Z_2 + Z_2^2 - 2\phi_{10}Z_1Z_2^2 + \phi_{10}^2Z_1^2Z_2^2 + Z_1Z_3 + Z_2Z_3 - 2\phi_{10}Z_1Z_2Z_3 + \phi_{10}^2Z_1^2Z_2Z_3)}{(Z_1 + Z_2 - 2\phi_{10}Z_1Z_2 - \phi_{10}Z_2^2 + \phi_{10}^2Z_1Z_2^2 + Z_3 - \phi_{10}Z_2Z_3 + \phi_{10}^2Z_1Z_2Z_3)} \quad (11)$$

Then, if equation (10) is differentiated with respect to temperature t, and $\phi_{10}$ is solved such that a resultant value of equation (10) becomes "0", the following equation (12) can be obtained:

$$\phi_{10} = 0, \frac{Z_1 + Z_2 + Z_3}{Z_1(Z_2 + Z_3)} \quad (12)$$

Therefore, in order to make the position of the beam on the image surface constant, $\phi_{10}$ may be set to satisfy the equation (12).

More particularly, positions passed through the first and second image-forming lenses 30a and 30b are shown in FIG. 10.

Regarding an amount of defocusing of the beam on the image surface, a condition that influence of change of temperature is not easily exerted can be shown by the following equation (13):

$$\left.\frac{\partial B}{\partial t}\right|_{t=0} = \left.\frac{\partial B}{\partial w}\right|_{w=0} = 0 \quad (13)$$

The equation (13) can be deformed to the following equation (14):

$$Z_1^2 + 2Z_1Z_2 - 2\phi_{10}Z_1^2Z_2 + Z_2^2 - 2\phi_{10}Z_1Z_2^2 + \phi_{10}^2Z_1^2Z_2^2 + \quad (14)$$
$$Z_1Z_3 + Z_2Z_3 - 2\phi_{10}Z_1Z_2Z_3 + \phi_{10}^2Z_1^2Z_2Z_3 = 0$$

On the other hand, the value given by the equation (8) has an extreme value, which can be obtained by the following equation (15):

$$\frac{\partial \phi_{20}}{\partial \phi_{10}} = 0 \quad (15)$$

In a case where the value given by the equation (8) is smaller than the extreme value obtained by the equation (15), a lateral magnification becomes negative. In a case where the value given by the equation (8) is larger than the extreme value obtained by the equation (15), a lateral magnification becomes positive.

As already explained, it has been known that all aberration of the lens system becomes smaller as power of the lens becomes smaller. Therefore, at the time of design, it is considered that a resultant value of the following equation (16) becomes minimum.

$$\phi_{10}^2 + \phi_{20}^2 \quad (16)$$

As already explained, each value of $\phi_{10}$ and $\phi_{20}$ is defined to be positive. If $\phi_{10}$, which gives a minimum value to the resultant value of $\phi_{10} + \phi_{20}$, is obtained by the following equation (17), the following equation (18) can be obtained:

$$\frac{\partial(\phi_{10} + \phi_{20})}{\partial \phi_{10}} = 0 \quad (17)$$

$$\phi_{10} = \frac{1}{Z_1} + \frac{2}{Z_2} \cdot \frac{1}{Z_1} \quad (18)$$

As explained above, the chief ray of the beam sent from the pre-deflection optical system is guided to the post-deflection optical system to satisfy the equation (11), thereby the useful result can be obtained.

In this case, power of the first image-forming lens 30a is preferably shown by the FIG. 10 and the following equation (19):

$$0 < \phi_{10} < \frac{Z_1 + Z_2 + Z_3}{Z_1(Z_2 + Z_3)} \quad (19)$$

The equation (19) can be satisfied only when the polarities of the respective $h_1$ and $h_2$ are different from each other in a condition that $\phi_{10}$ of each of $z_1$, $z_2$, $z_3$ is set at the horizontal axis, and $h_1$, and $h_2$ are set at the vertical axis in FIG. 10. However, the equation (11) is limited by the scanning width (swing angle of light), which depends on the reflective surface of the deflector 5. Therefore, in a case where the swing angle of light is conformed to a maximum effective swing angle θ of the beam reflected on the reflected surface, the optimum amount, which is obtained by the equation (11) becomes 1/cosθ times of (11).

In addition, from the other factors such as convergence on the image surface, and the amount of curve of the scanning line, it can be confirmed by simulation that a good result can be obtained in the range of Q≦2 if the amount obtained from the equation (11)×(1+1/cosθ)/2 is Q.

Therefore, regarding the paraxial ray, the respective beams are preferably made incident onto each of the lenses 30*a* and 30*b* as to be crossed at the position where power $\phi_1$ of the sub-scanning direction of the first image-forming lens 30*a* is satisfied by the equation (19) and Q≦2 is satisfied.

Moreover, even if power of the sub-scanning direction of each of the lenses 30*a* and 30*b* is defined to be positive, power of each of the finite focal lenses 9Y, 9M, 9C, and 9B of the pre-deflection optical system 7Y, 7M, 7C and 7B, and the hybrid cylinder lenses 11Y, 11M, 11C, and 11B is suitably set, thereby easily removing influence due to the temperature change or humidity change of defocusing of the sub-scanning direction caused by the lenses 30*a* and 30*b*.

As mentioned above, at least two laser beams of four laser beams are guided to the image surface (not shown) from the directions, which are opposite to each other, to sandwich the optical axis O of the system. Thereby, it is possible to reduce the thickness of each reflective surface of the deflector 5, and the shift of the position in the sub-scanning direction on the image surface caused by thermal expansion and the variation of the refractive index caused by the change of the temperature of PMMA, which is used as material of the lenses 30*a* and 30*b*.

The following will explain the shape of the lens surface of each of the first and second plastic lenses 30*a* and 30*b*, the variation of the image-forming surface, and the aberration characteristics with reference to Tables 3 to 6.

TABLE 3 polynominal coefficient A of one surface

| n/m | 0 | 1 | 2 | 3 | 4 | 5 |
|---|---|---|---|---|---|---|
| | | | mn | | | |
| 0 | 0 | 0 | $4.928 \times 10^{-8}$ | $3.077 \times 10^{-10}$ | $7.322 \times 10^{-13}$ | 0 |
| 1 | 0 | 0 | $6.616 \times 10^{-10}$ | $-5.249 \times 10^{-13}$ | 0 | 0 |
| 2 | $-4.576 \times 10^{-5}$ | $1.948 \times 10^{-6}$ | $2.268 \times 10^{-11}$ | 0 | 0 | 0 |
| 3 | $-3.363 \times 10^{-7}$ | $4.229 \times 10^{-8}$ | 0 | 0 | 0 | 0 |
| 4 | $2.410 \times 10^{-9}$ | $2.081 \times 10^{-10}$ | 0 | 0 | 0 | 0 |
| 5 | 0 | 0 | 0 | 0 | 0 | 0 |

TABLE 4 polynominal coefficient A of two surface

| n/m | 0 | 1 | 2 | 3 | 4 | 5 |
|---|---|---|---|---|---|---|
| | | | mn | | | |
| 0 | 0 | 0 | $5.071 \times 10^{-7}$ | $4.480 \times 10^{-10}$ | $4.671 \times 10^{-13}$ | 0 |
| 1 | 0 | 0 | $-8.114 \times 10^{-10}$ | $1.936 \times 10^{-12}$ | 0 | 0 |
| 2 | $-3.029 \times 10^{-5}$ | $3.837 \times 10^{-7}$ | $-6.992 \times 10^{-13}$ | 0 | 0 | 0 |
| 3 | $-5.029 \times 10^{-7}$ | $3.103 \times 10^{-8}$ | 0 | 0 | 0 | 0 |
| 4 | $1.850 \times 10^{-9}$ | $1.106 \times 10^{-9}$ | 0 | 0 | 0 | 0 |
| 5 | 0 | 0 | 0 | 0 | 0 | 0 |

TABLE 5 polynominal coefficient A of three surface

| n/m | 0 | 1 | 2 | 3 | 4 | 5 |
|---|---|---|---|---|---|---|
| | | | mn | | | |
| 0 | 0 | 0 | $-1.596 \times 10^{-9}$ | $2.415 \times 10^{-12}$ | $-4.472 \times 10^{-17}$ | 0 |
| 1 | 0 | 0 | $-9.105 \times 10^{-13}$ | $8.684 \times 10^{-16}$ | 0 | 0 |
| 2 | $-9.662 \times 10^{-7}$ | $-9.782 \times 10^{-9}$ | $1.318 \times 10^{-14}$ | 0 | 0 | 0 |
| 3 | $1.488 \times 10^{-8}$ | $1.148 \times 10^{-10}$ | 0 | 0 | 0 | 0 |
| 4 | $1.491 \times 10^{-11}$ | $2.298 \times 10^{-10}$ | 0 | 0 | 0 | 0 |
| 5 | 0 | 0 | 0 | 0 | 0 | 0 |

TABLE 6 polynominal coefficient A of four surface

| n/m | mn 0 | 1 | 2 | 3 | 4 | 5 |
|---|---|---|---|---|---|---|
| 0 | 0 | 0 | $-7.741 \times 10^{-8}$ | $8.814 \times 10^{-13}$ | $1.685 \times 10^{-16}$ | 0 |
| 1 | 0 | 0 | $1.082 \times 10^{-11}$ | $1.155 \times 10^{-15}$ | 0 | 0 |
| 2 | $4.604 \times 10^{-6}$ | $4.553 \times 10^{-9}$ | $2.291 \times 10^{-14}$ | 0 | 0 | 0 |
| 3 | $6.958 \times 10^{-9}$ | $1.237 \times 10^{-10}$ | 0 | 0 | 0 | 0 |
| 4 | $2.239 \times 10^{-10}$ | $-1.696 \times 10^{-12}$ | 0 | 0 | 0 | 0 |
| 5 | 0 | 0 | 0 | 0 | 0 | 0 |

In the conventional optical scanning unit, if a toric lens is used, three or more image-forming lenses are needed to optimize a spherical aberration, a coma aberration, a field curve, and an error of magnification.

The following will explain the result of the simulation of the shape of each of lens surfaces 30ain, 30ara, 30bin, and 30bra by use of a polynomial shown in equation (2) of Table 2.

From terms n≠0 of Amn and Amn≠0, the spherical aberration, coma aberration, field curve, and error of magnification can be optimized. Also, from terms m≠0 of Amn and Amn≠0, various aberration characteristics of the main scanning direction can be optimized.

According to the result of the simulation of respective lens surfaces of the first and second plastic lenses 30a and 30b, the following points becomes clear.

More specifically, in a case where at least one lens surface of the four lens surfaces (lens surface numbers 1 to 4) includes terms n≠0 of Amn and Amn≠0 (no specific rotational symmetrical axis is included), the correction of the coma aberration, and that of the spherical aberration become insufficient. As a result, the beam spot diameter of the cross section at the image-forming surface becomes about 100 $\mu$mm. Moreover, in a case where the number of the lens surfaces including terms n≠0 of Amn and Amn≠0 is two or more, the beam spot diameter of the cross section at the image-forming surface can be reduced to about 40 $\mu$m.

If the total number of Amn (context of sigma) shown in equation (1) in connection with the lens surfaces of each lens is simulated, it can be confirmed that the various aberration characteristics of the main scanning and the sub-scanning directions can be satisfactorily set in a condition that the value of m+n of Amn is "5", that is, "1<m+n<5" is satisfied as shown in Tables 3 to 6.

Referring back to FIG. 2, the following will explain the relationship between each inclination of the laser beams LY, LM, LC, and LB, which are deflected by the mirror body 5a of the deflector 5 and emitted to the outer unit of the laser exposure unit 1 through the post-deflection optical system 21, and the mirrors 33B, 37Y, 37M, and 37C.

As explained above, the respective laser beams LY, LM, LC, and LB are deflected by the mirror body 5a of the deflector 5. Then, the predetermined aberration characteristics are provided to respective laser beams through the post-deflection optical system 21, that is, first and second plastic lenses 30a and 30b. Thereafter, these laser beams are bent in a predetermined direction through the first mirrors 33Y, 33M, 33C, and 33B.

The laser beam LB corresponding to B (black image) is reflected by the first mirror 33B, and passed through the dustproof glass 39B to be guided to the image surface. The other laser beams are guided to the second mirrors 35mnY, 35M, and 35C, and reflected toward the third mirrors 37Y, 37M, and 37C. The respective laser beams LY, LM, LC, which are reflected by the third mirrors 37Y, 37M, 37C, are image-formed on the image surface with substantially an equal interval through the dustproof glasses 39Y, 39M, and 39C. In this case, the laser beam LB emitted from the mirror 33B and the laser beam LC adjacent to the laser beam LB are also image-formed on the image surface with substantially an equal interval.

As explained above, the laser beam LB is emitted from the laser 3B, and passed through the pre-deflection optical system excluding the combined mirror 13, that is, the finite focal lens 9B and the hybrid cylinder lens 11B. Then, the laser beam LB is only reflected by the reflective surfaces of the mirror body 5a and the combined mirror 13, passed through the post-deflection optical system 21, that is, first and second plastic lenses 30a and 30b, and emitted by the mirror 33B to be emitted to the outer unit of the laser exposure unit 1. In other words, after the laser beam LB is deflected by the mirror body 5a, the laser beam can be emitted from the laser exposure unit 1 by only reflecting the mirror 33B. Thereby, there can be ensured the laser beam LB to be guided by substantially only mirror 33B. In a case where a plurality of mirrors exist in the optical path, the laser beam LB is useful as a reference beam of light in relatively correcting the other laser beams in view of the variation of the aberration characteristics of the image on the image surface multiplied in accordance with the number of mirrors.

In the case where a plurality of mirrors exist in the optical path, the number of mirrors to be used for each laser beam is preferably set to an odd number or an even number. In other words, as shown in FIG. 2, the number of mirrors after the deflector 5 relating to the laser beam LB is one (odd number) excepting the mirror body 5a of the deflector 5. The number of mirrors relating to each of the laser beams LC, LM and LY is three (odd number). It is assumed that the second mirror 35 relating to any one of the laser beams is omitted. The direction of the curve of the main scanning line, which is caused by the inclination of the lens, of the laser beam (number of mirror: even number) passing through the optical path where the second mirror 35 is omitted, is opposite to the direction of the curve of the main scanning line, which is caused by the inclination of the lens, of the other laser beams (the number of mirror: odd number). As a result, there occurs an error of the registration in reproducing a predetermined color.

Therefore, the number of mirrors provided in the optical path of each of the laser beams LY, LM, LC, and LB is set to be substantially the odd or even number in overlaying four laser beams LY, LM, LC and LB to reproduce a predetermined color.

As explained above, according to the multi-beam exposer unit of the present invention, all beams emitted from the plurality of light sources are guided to the predetermined image surface by the same post-deflection optical systems having one deflecting means for determining the position of each beam in the main scanning direction, and two lenses in which at least one surface does not include the rotational symmetrical surface. Thereby, even if the shape of any one of the lenses differs from the predetermined shape or the attaching position of any one of the lenses differs from the predetermined state, the same influence is exerted to all beams. Therefore, the color shift or the variation of the color phase, which is caused by the position shift of the beams reached the image surface, can be reduced. Moreover, the spherical aberration and the coma aberration, which are provided to each beam by the post-deflection optical system, can be minimized. Then, a convergent diameter of the beam at the image surface can be maintained to be a predetermined value, and the variation of the convergent diameter of the beam at the image surface, which is caused by defocusing, can be restrained.

Therefore, according to the present invention, there can be provided a multi-beam exposer unit, which can reduce the distance between the deflector and the image surface, that is, the size of the optical device, and which can be applied to the image forming unit for forming a color image having no registration error, with low cost.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-beam laser exposure unit, comprising:

a plurality of light beam sources each emitting a light beam;

pre-deflection optical means for converting said light beams to a convergent light beam in a first direction;

deflecting means, having a plurality of reflective surfaces, formed to be rotational about a rotational axis, said first direction parallel to said rotational axis, for deflecting said light beams emitted from said light beam sources in a predetermined direction, wherein said light beams are guided from said pre-deflection optical means to be incident on one of said reflective surfaces at the same time, wherein distances between said light beams on said one of said reflective surfaces are different from each other in a direction parallel to said rotational axis and thereby the light beams are deflected in the predetermined direction at the same time at different pitches;

post-deflection optical means having lenses capable of image-forming each of said light beams deflected by said deflecting means to be scanned on a predetermined image surface at a uniform speed, and said lenses capable of correcting influence of variation of an inclination of said one of said reflective surfaces on a position of a light beam on the predetermined image surface, being exerted onto each of the light beams, expressed as deviation of an angle formed between said reflective surface and the rotational axis of the reflective surface; and at least two groups of post-deflection mirror members for separating said respective light beams passed through said post-deflection optical means, a first group of mirror members arranged at different distances from the deflecting means receiving the light beams directly from said post-deflection optical means and a second group of mirror members spaced at a smaller optical-path distance away from the predetermined image surface than the first group of mirror members, wherein at least one of the second group of mirror members receives a light beam reflected from one of the first group of mirror members, and wherein, the first group of mirror members are arranged in such a manner that, of the light beams deflected by the deflecting means, a light beam which forms the shortest distance on said reflective surface from an adjacent beam in a direction parallel to said rotational axis of said deflecting means travels the smallest optical-path distance from a corresponding one of the first group of mirro members to the image surface.

2. The multi-beam laser exposure unit of claim 1, wherein one of the first group of mirror members receives said predetermined light beam is the same as one of the second group of mirror members receiving the predetermined light beam.

3. The multi-beam laser exposure unit of claim 1, wherein at least three of the second group of mirror members receives a light beam reflected from the first group of mirror members.

4. A multi-beam laser exposure unit, comprising:

at least three light beam sources emitting light beams, a first light beam source emitting a first light beam, a second light beam source emitting a second light beam, and a third light beam source emitting a third light beam;

pre-deflection optical means for converting said light beams to a convergent light beam in a first direction;

deflecting means, having a plurality of reflective surfaces, formed to be rotational about a rotational axis, said first direction parallel to said rotational axis, for deflecting said light beams emitted from said light beam sources in a predetermined direction, wherein said light beams are guided from said pre-deflection optical means to be incident on one of said reflective surfaces at the same time, and a distance between the first light beam and the second light beam incident on said one of said reflective surfaces in the direction parallel to said rotational axis is smaller than a distance between the second light bean and the third light beam incident on said one of said reflective surfaces in the direction parallel to said rotational axis, and thereby the light beams are deflected in the predetermined direction at the same time at different pitches;

post deflection optical means having lenses capable of image-forming each of said light beams deflected by said deflecting means to be scanned on a predetermined image surface at a uniform speed, and said lenses capable of correcting an influence of variation of an inclination of said one of said reflective surfaces on a position of a light beam on the predetermined image surface, being exerted onto each of the light beams, expressed as deviation of an angle formed between said reflective surface and the rotational axis of the reflective surface; and at least three-post deflection mirror members arranged at different distances from the deflecting means, for reflecting the light beams passed through said post-deflection optical means, a first mirror member reflecting the first light beam, a second mirror member reflecting the second light beam and a third mirror member reflecting the third light beam, wherein the second mirro member is spaced at a smaller optical-path distance to the image surface than an optical-path distance between the third mirror member and the image surface, and the first mirror member reflects the first light beam directly to the image surface.

5. A multi-beam laser exposure unit comprising:

at least three light beam sources emitting light beams, a first light beam source emitting a first light beam, a second light beam source emitting a second light beam, and a third light beam source emitting a third light beam;

pre-deflection optical means for converting said light beams to a convergent light beam in a first direction;

deflecting means, having a plurality of reflective surfaces, formed to be rotational about a rotational axis, said first direction parallel to said rotational axis, for deflecting said light beams emitted from said light beam sources in a predetermined direction, wherein said light beams are guided from said pre-deflection optical means to be incident on one of said reflective surfaces at the same time, and a distance between the first light beam and the second light beam incident on said one of said reflective surfaces in the direction parallel to said rotational axis is smaller than a distance between the second light beam and the third light beam incident on said one of said reflective surfaces in the direction parallel to said rotational axis, and thereby the light beams are deflected in the predetermined direction at the same time at different pitches;

post-deflection optical means having lenses capable of image-forming each of said light beams deflected by said deflecting means to be scanned on a predetermined image surface at a uniform speed, and said lenses capable of correcting an influence of variation of an inclination of said one of said reflective surfaces on a position of a light beam on the predetermined image surface, being exerted onto each of the light beams, expressed as deviation on of an angle formed between said reflective surface and the rotational axis of the reflective surface; and at least five post-deflection mirror members arranged at different distances from the deflecting means, for reflecting the light beams passed through said post-deflection optical means, a first mirror member reflecting the first light beam, a second mirror member reflecting the second light beam, a third mirror member reflecting the third light beam, a fourth mirror member located between the second mirror member and the predetermined image surface, and a fifth mirror member located between the third mirror member and the predetermined image surface, wherein the second mirror member is spaced at a smaller optical-path distance away from the image surface than an optical-path distance between the third mirror member and the image surface, and the first mirror member reflects the fist light beam directly to the image surface.

* * * * *